United States Patent [19]

Aloy

[11] Patent Number: 4,824,177

[45] Date of Patent: Apr. 25, 1989

[54] SPOKED VEHICLE WHEEL WITH TUBELESS TIRE

[76] Inventor: Jorge N. Aloy, Sant Just Residencial No. 91, Sant Just Desvern, Barcelona, Spain

[21] Appl. No.: 114,904

[22] Filed: Oct. 29, 1987

[51] Int. Cl.⁴ .............................................. B60B 1/02
[52] U.S. Cl. ...................................... 301/58; 301/97; 152/384
[58] Field of Search ....................... 301/55, 56, 58, 61, 301/67, 104, 97; 152/384, 379.4, 379.3, 379.5, 381.3, 381.4, 381.6; 411/910, 377, 429, 431

[56] References Cited

U.S. PATENT DOCUMENTS

| | | | |
|---|---|---|---|
| 3,008,770 | 11/1961 | Mueller | 301/58 X |
| 3,645,580 | 2/1972 | Spies | 301/59 X |
| 4,108,232 | 8/1978 | Simpson | 152/513 |
| 4,150,854 | 4/1979 | Lohmeyer | 301/58 |
| 4,165,776 | 8/1979 | Marvy | 152/381.3 |
| 4,305,622 | 12/1981 | Mitchell | 301/58 |
| 4,448,456 | 5/1984 | Pfundsfein | 301/58 |

Primary Examiner—Johnny D. Cherry
Assistant Examiner—Brian Sells
Attorney, Agent, or Firm—Flynn, Thiel, Boutell & Tanis

[57] ABSTRACT

A wheel structure, such as for a motorcycle, having a wheel provided with an annular rim which surrounds and is joined to a central support hub through a plurality of radial spokes, which spokes have the outer ends projecting through the rim and rigidly anchored thereto. The rim has a shallow annular groove externally formed in surrounding relationship thereto, which groove includes the region of the rim through which the spokes project. An annular elastic band is positioned within the shallow groove and sealingly engages the bottom wall of the groove. A tubeless inflatable tire can be mounted on the rim, and the interior of the tire is isolated from the spokes and any openings associated therewith due to the elastic band which sealingly surrounds the rim.

4 Claims, 1 Drawing Sheet

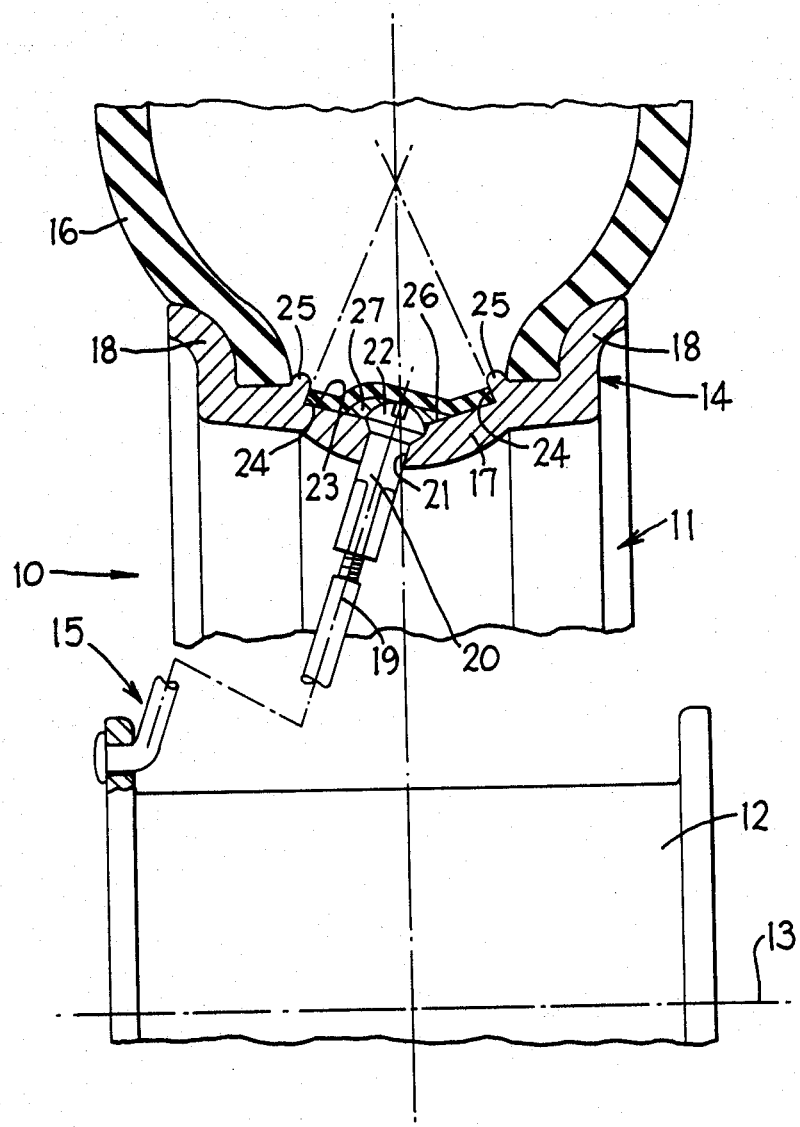

SPOKED VEHICLE WHEEL WITH TUBELESS TIRE

FIELD OF THE INVENTION

This invention relates to an improved wheel structure of the type employing multiple radial spokes, particularly for a motorcycle or the like, which wheel structure permits use with a tubeless pneumatic tire.

Most motorcycles employ spoke-type wheels wherein the annular rim is surrounded by a tire which includes an inflatable inner tube. The use of such inner tube is generally required in order to create a properly sealed chamber since the spokes typically project through the annular rim of the wheel and, absent the inner tube, would permit leakage therethrough if the wheel were used with a tubeless-type inflatable tire.

Accordingly, it is an object of this invention to provide an improved spoke-type wheel which overcomes the above disadvantage so as to permit the wheel to be used in conjunction with an inflatable tubeless tire.

In the improved arrangement of the present invention, the annular rim of the wheel has a peripheral groove formed therein and extending therearound, and the radially outer ends of the spokes project through the rim into this groove. An annular elastic band is positioned within this peripheral groove in surrounding relationship to the annular rim, which elastic band overlaps and sealingly closes off the outer ends of the openings through the rim which accommodate the spokes, whereby the rim can mount thereon an inflatable tubeless tire.

In the preferred arrangement, a recessed disk is positioned over the outer ends of the spoke structures so as to protect the elastic band.

The invention is described in greater detail hereandafter.

The sole drawing FIGURE illustrates a fragmentary cross-sectional view of an improved wheel structure according to the present invention.

Referring to the drawing, the wheel structure 10 includes a wheel 11 having a central hub 12 adapted to support the wheel for rotation in a conventional manner about an axis 13. The wheel 11 includes an annular rim 14 which is radially spaced from and concentrically surrounds the hub 12, with the rim 14 being joined to and carried by the hub 12 through a plurality of spoke structures 15. The spoke structures 15 are spaced circumferentially around the wheel and extend radially between the hub 12 and rim 14, with opposite ends of the spokes being fixedly connected thereto.

The improved wheel structure 10 of the present invention is adapted to have a conventional inflatable tubeless tire 16 sealingly mounted on and in surrounding relationship to the rim 14, the structure of the tire 16 and its attachment to the rim 14 being conventional.

As shown in the drawing, the rim 14 has a generally shallow outwardly-opening channel-shaped cross-sectional configuration formed by a base web 17 which, adjacent the opposite side edges thereof, is integrally joined to side flanges 18 which are rolled radially outwardly for engagement with the sealing beads on the tire 16.

The spoke structure 15, as is generally conventional, includes an elongate rodlike element 19 which is threadably engaged within a tensioning nut or screw 20, the latter projecting outwardly through an opening 21 formed in the web 17 and terminating in an enlarged head 22 which is seated against an outer surface of the web 17. The structure of the spoke 15 is conventional so that further detailed description thereof is believed unnecessary.

In the present invention, the rim 14 is provided with a shallow groove or recess 23 formed in the web 17 in external surrounding relationship thereto, this groove 23 being located generally centrally between the side flanges 18. This shallow groove 23 is of substantial width and terminates at opposite sides thereof in dovetail edges or boarders 24. That is, these opposed side edges 24, when projected outwardly (upwardly in the drawing) in the opening direction of the groove are in converging relationship with one another. The dovetail edges also project outwardly so that the rim is provided with outwardly projecting ridges or protrusions 25 which extend annularly around the rim directly adjacent each edge of the groove.

To sealingly isolate the spokes and specifically the openings 21 from the interior of the inflatable tubeless tire 16, an annular endless elastic band or belt 26 is positioned within the shallow groove 23 in surrounding relationship to the rim 14. This elastic band 26 is relatively wide, that is it has a width which substantially corresponds to the groove 23, whereupon the edges of the band 26 are hence held within the dovetail edges 24. These edges or borders 24 converge as they project outwardly so that outward extensions of these surfaces effectively converge at a single point which is spaced radially outwardly from the rim and lies substantially on the central plane thereof.

The band 26 when mounted on the rim is somewhat elastically stretched, whereupon the band 26 hence maintains a tight sealed engagement with the rim wall which defines the bottom of the shallow groove 23.

This shallow groove 23 has a bottom wall which is not flat, but rather is preferably formed by circumferentially-extending side wall portions which extend at a small angle with respect to one another. These side wall portions hence effectively defining a shallow V-shaped trough having its apex or deepest point in the vicinity of the central plane of the wheel. This configuration of the groove 23, namely the manner in which the side wall portions radially inwardly converge with respect to one another as they project toward the central plane, hence facilitates a proper sealing engagement of the elastic band with the bottom wall since this relationship causes the elastic band to substantially automatically shrink both radially inwardly and axially inwardly toward the central plane so as to achieve a tight sealing engagement with all of the respective walls and surfaces.

To protect the elastic band 26 from the tensioning screws or nuts 20, a protective disc 27 is positioned directly over the projecting head of each tensioning nut 20. The protective disc 27 has an appropriate recess therein for accommodating the projecting head. This protective disc 27 hence eliminates any sharp edges or corners, and at the same time it is held in position by the elasticity of the band 26.

The rim 14 also has small annular beads 25 projecting radially outwardly thereof adjacent opposite sides of the groove 23, which beads 25 assist in seating the flanges of the tire.

The embodiments of the invention in which an exclusive property or privilege is claimed are defined as follows:

1. An improved spoke-type wheel structure for permitting use thereon of a tubeless pneumatic tire, such as for a motorcycle wheel, characterized by an annular tire support rim having peripherially in its outer perimetrical side and centered in the width thereof an annular groove having a bent bottom wall and beveled convergent lateral borders, a perimetrical annular elastic belt surrounding the rim within the groove for covering the heads of tension nuts of the wheel spokes which project outwardly through the rim into the groove, and a recessed metallic disc positioned under the elastic belt in overlying relation to the outer end of each spoke.

2. In a wheel structure, such as for a motorcycle, said wheel structure including a wheel having a central hub for supporting the wheel structure for rotation about an axis, the wheel also including an annular rim which concentricallysurrounds the hub and is rigidly joined thereto through a plurality of elongated rodlike spoke structures which extend radially between the hub and annular rim, said rim being adapted to have a pneumatically-inflatable tire mounted thereon in surrounding relationship thereto, said rim having a shallow outwardly-opening channel-like cross section formed by a pair of radially outwardly projecting side flanges joined together by a transversely extending web, comprising the improvement wherein said web has a shallow annular groove formed exteriorly therein and opening radially outwardly thereof, said groove being located substantially on and projecting sidewardly away from a central plane of said wheel which extends perpendicularly with respect to the rotational axis, said groove terminating in beveled side edges which converge with respect to one another when extended radially outwardly away from the web, said spoke structure having a radially outer end thereof projecting through said web into said shallow groove and terminating in an end part positioned substantially within said shallow groove, and an endless elastic belt positioned within said shallow groove in surrounding relationship to said rim for sealingly isolating the outer ends of said spoke structures from the interior of the inflatable tire which is mounted on said rim, said elastic band being maintained in an elastically stretched position when mounted on said rim, said elastic band being thin but relatively wide so as to substantially totally occupy said shallow groove, said elastic band having free edges thereof disposed adjacent the beveled side edges of said groove, and wherein a protective disklike member is positioned within said shallow groove in overlying relationship to the end part of each said spoke structure, said protective member being positioned under said elastic band so as to be held against the bottom wall of said groove.

3. A structure according to claim 2, wherein said shallow groove has a bottom wall which includes generally flat side wall portions which are disposed generally on opposite sides of said central plane, said side wall portions converging radially inwardly toward one another as they project axially inwardly toward said central plane so that the bottom wall defines a shallow radially-inwardly angled V-shaped configuration.

4. A structure according to claim 2, wherein said elastic band surrounds the rim and the end parts of the spokes and effects a sealing engagement with the flat side wall portions of the groove, whereby said elastic band substantially conforms to the angled configuration of the bottom wall.

* * * * *